May 8, 1945.   H. M. CAMERON   2,375,281
AUDIBLE SIGNAL
Filed July 14, 1944   3 Sheets-Sheet 1

Inventor

HAROLD M. CAMERON,

By *Clarence A. O'Brien and Harvey B. Jacobson*
Attorneys

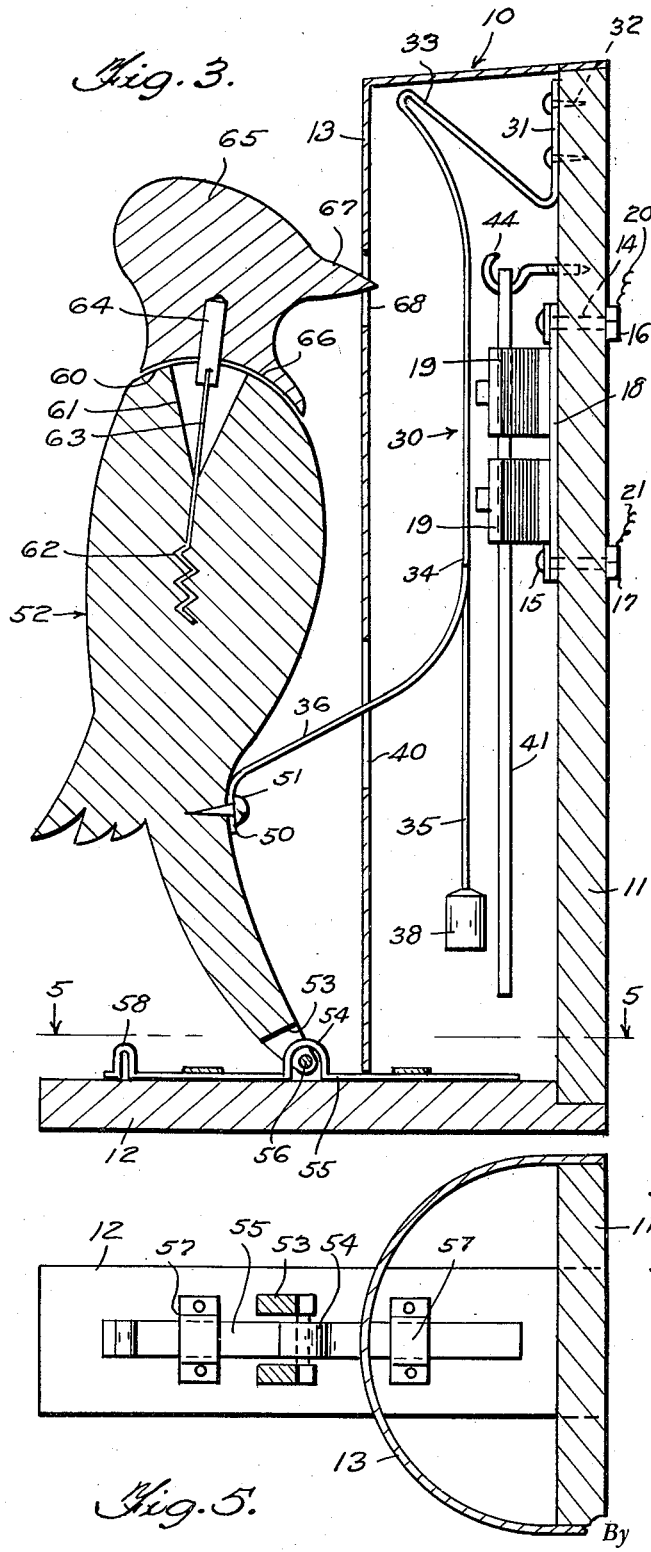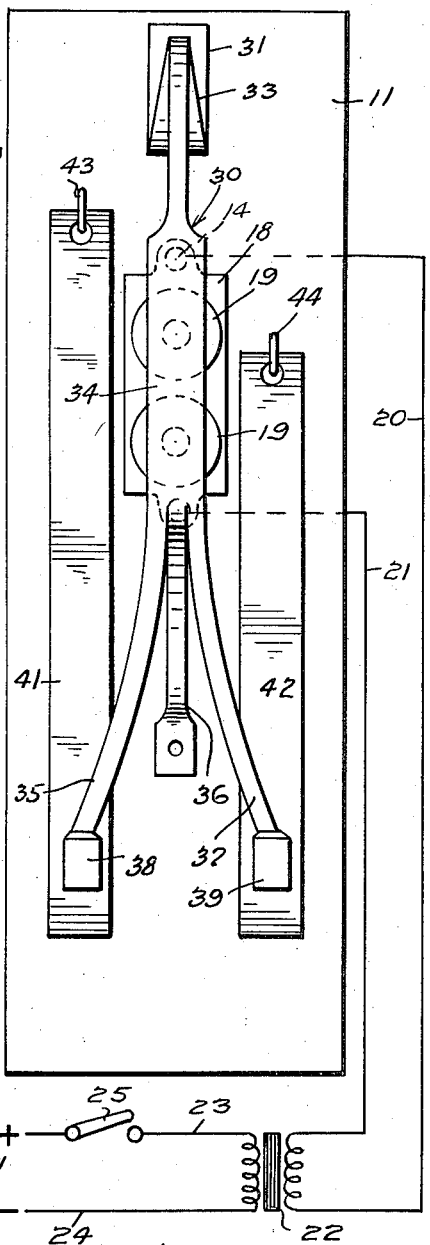

May 8, 1945.  H. M. CAMERON  2,375,281
AUDIBLE SIGNAL
Filed July 14, 1944  3 Sheets-Sheet 3

Inventor
HAROLD M. CAMERON,
By Clarence A. O'Brien
and Harvey B. Jackson
Attorneys Patented May 8, 1945

2,375,281

UNITED STATES PATENT OFFICE 2,375,281

AUDIBLE SIGNAL

Harold M. Cameron, Highland Park, N. J.

Application July 14, 1944, Serial No. 544,924

3 Claims. (Cl. 177—7)

This invention relates to an audible signal and more particularly to such a device as an electric door bell or buzzer or the like.

A primary object of this invention is the provision of an audible signal characterized by improved tone qualities and enhanced appearance.

An additional object is the provision of such a device wherein the intensity of the sound emitted thereby may be readily varied at will.

A more specific object is the provision of such a bell formed in simulation of a woodpecker wherein the portion representing the bird is adapted to move in a manner similar to that of a live woodpecker tapping a tree trunk.

A still further object is the provision of means whereby the head of the simulated bird moves with respect to the body thereof thus creating a pendulum effect to increase the movement of the bird body and head.

A still further object is the provision of such a device which will be relatively simple and inexpensive to manufacture, sturdy and durable in construction, reliable in operation, and attractive in appearance.

Other objects reside in the combinations of elements, features of construction, and arrangements of parts, all as will be more fully pointed out hereinafter and shown in the accompanying drawings, wherein there is disclosed a preferred embodiment of this inventive concept.

Like reference numerals refer to like parts throughout the several views of the drawings.

In the drawings:

Figure 3 is a sectional view taken along the line 3—3 of Figure 2.

Figure 4 is a front elevational view of a portion of the structure shown in Figures 1 and 2 in dotted lines showing the cover of the device removed and certain interior operating mechanism shown in association with a schematic wiring diagram.

Figure 5 is a sectional view taken along the line 5—5 of Figure 3 as viewed in the direction indicated by the arrows.

Figures 1, 2:
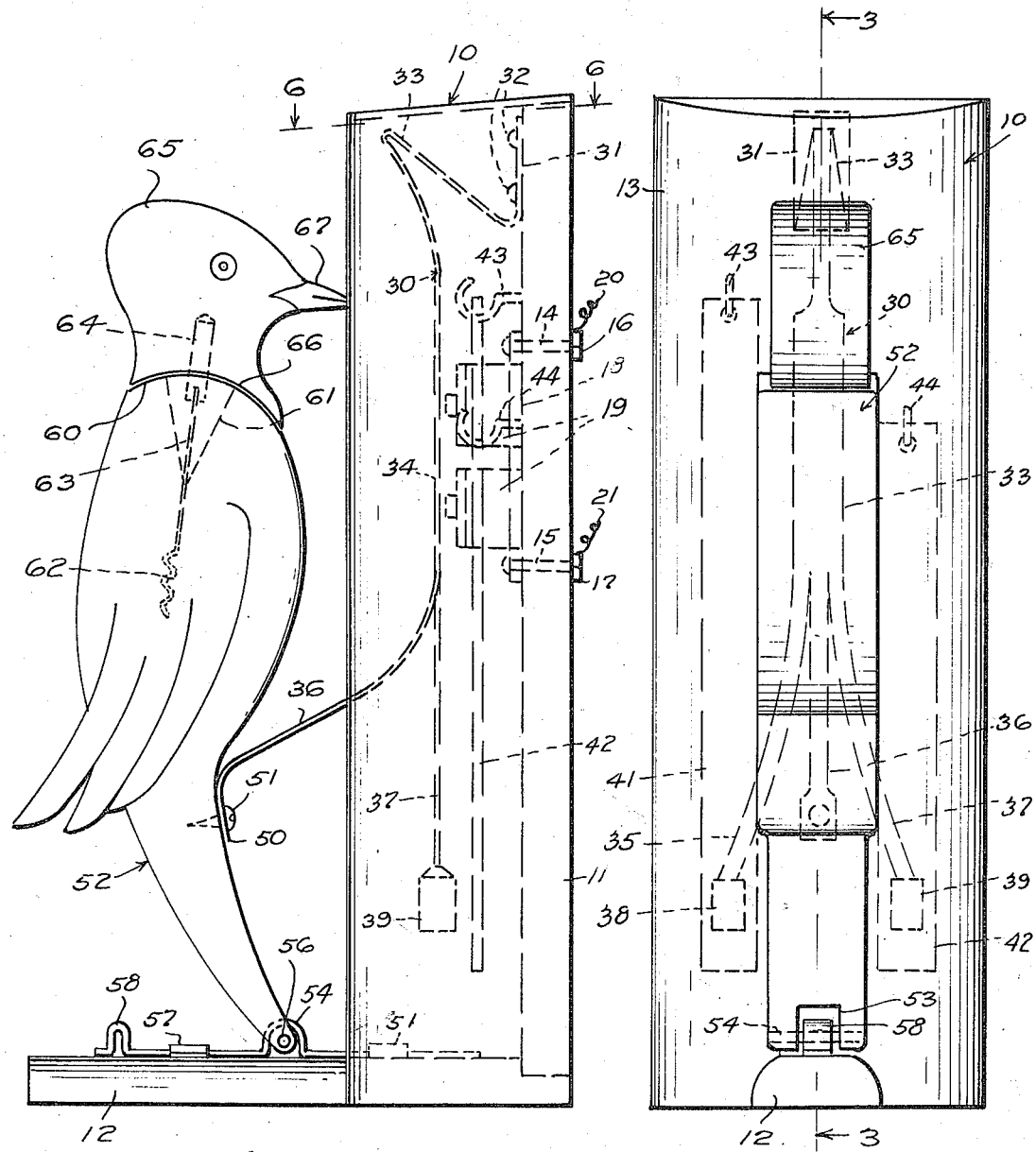
Figure 1 is a side elevational view of one form of device embodying this invention, certain parts thereof being indicated in dotted lines.
Figure 2 is a front elevational view of the device in Figure 1, certain parts thereof being indicated in dotted lines.
Figure 6:
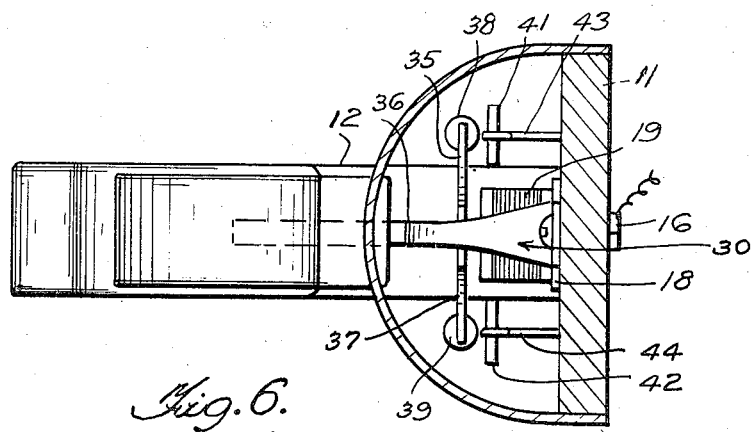
Figure 6 is a sectional view taken along the line 6—6 of Figure 1 as viewed in the direction indicated by the arrows.

Having particular reference now to the drawings, there is generally indicated at 10 a casing comprised of a back plate 11 adapted to be secured to a wall or door or the like, and a base plate 12 set at substantially right angles thereto. A cover 13 formed of sheet metal, plastic, or the like, of semi-cylindrical form, and preferably ornamented in simulation of a tree trunk is provided and adapted to engage back plate 11 being held in position by friction or if desired attaching means of any desired sort. Face plate 12 extends, as best shown in Figures 1 and 5, a considerable distance outwardly with respect to cover 13, for a purpose to be described hereinafter.

Secured to back plate 11 as by bolts 14 and 15, provided with nuts 16 and 17, respectively, to form terminal posts, is a plate 18 on which are mounted two relay coils 19. Relay coils 19 are, as best shown in Figure 4, energized through a pair of wires 20 and 21 suitably secured, by nuts 16 and 17 to terminal posts 14 and 15 and extending to the low side of a transformer schematically indicated at 22, current being supplied to the high side of the transformer as by suitable lines 23 and 24. A suitable switch 25 is provided in one of the lines for closing the circuit as desired, and may take the form of a remotely located conventional push button. Energization of coils 19 causes the vibration of an armature generally indicated at 30, in a known manner. Armature 30 is comprised of a vertical portion 31 secured as by suitable screws 32 to back wall 11, a bent portion 33 extending at an angle from portion 32 to form a spring to enhance the resiliency of the armature and a second vertical portion 34 extending adjacent the poles of coils 19. The lower portion of armature 30 is split in three parts, 35, 36 and 37, the two outer portions 35 and 37, terminating in suitable weights or strikers 38 and 39, and the central portion extending outwardly through a suitable aperture 40 in the front wall of cover 13. Strikers 38 and 39 are adapted to strike, when the armature is actuated against suitable sounding members 41 and 42, respectively, secured in suspended relation to back wall 11 as by hooks 43 and 44. Members 41 and 42 are preferably of different length to provide sounds of different tone and may be manufactured of wood, plastic, or metal, as desired to provide a variety of sound effects ranging from the simulation of the sound produced by a woodpecker to the tone of chimes, for example.

Central portion 36 of armature 30 terminates in a bent portion 50 secured as by a screw 51 to a body generally indicated at 52 in simulation of the body of a woodpecker. The lower extremity or tail of body 52 terminates in a bifurcated portion 53 adapted to be positioned over a bend 54, in a member 55 mounted for sliding movement on base member 12. A pivot pin 56 passed through bifurcation 53 and under loop 54 serves to mount the body of the bird for pivotal movement when moved by the energization of armature 30. Member 55 is secured in related assembly with base 12 as by bracket 57 and is provided with a second looped portion 58 which forms a finger grip permitting the same, and hence the tail of bird body 52, to be moved toward and away from back plate 11. Such movement correspondingly varies the distance of strikers 38 and 39 from their associated mounting members 41 and 42 whereby the intensity of the sound made by the device may be varied from silent through medium to loud as desired.

The upper portion of body 52 is curved as indicated at 60 and provided with an angled interior recess 61 within which is secured as by a screw or the like 62 a resilient rod 63 terminating in a weight 64. Weight 64 is suitably secured within a portion 65, in simulation of the head of a woodpecker having an arcuate lower surface 66 adapted closely to conform to curved surface 60 of body 52, and being provided with a portion 67 in simulation of a beak adapted to project into and out of an aperture 68 in the front wall of cover 13.

From the foregoing it will now be readily apparent that when coils 19 are energized in the manner previously described, bird body 52 is caused to pivot back and forth toward and away from cover 13 about pivot 56 and due to the arrangement of weight and resilient member 64 and 63 above described, said portion 65 is caused to oscillate at a relatively greater speed over a greater arc thus effectively simulating the actual appearance of woodpecker in action. Simultaneously strikers 38 and 39 are caused to intermittently contact their associated sounding members 41 and 42 to occasion the desired sound, the intensity of such sound being governed by the position of pivot 56 with relation to the front wall of cover 13 in the manner previously set out.

Figures 7, 8:
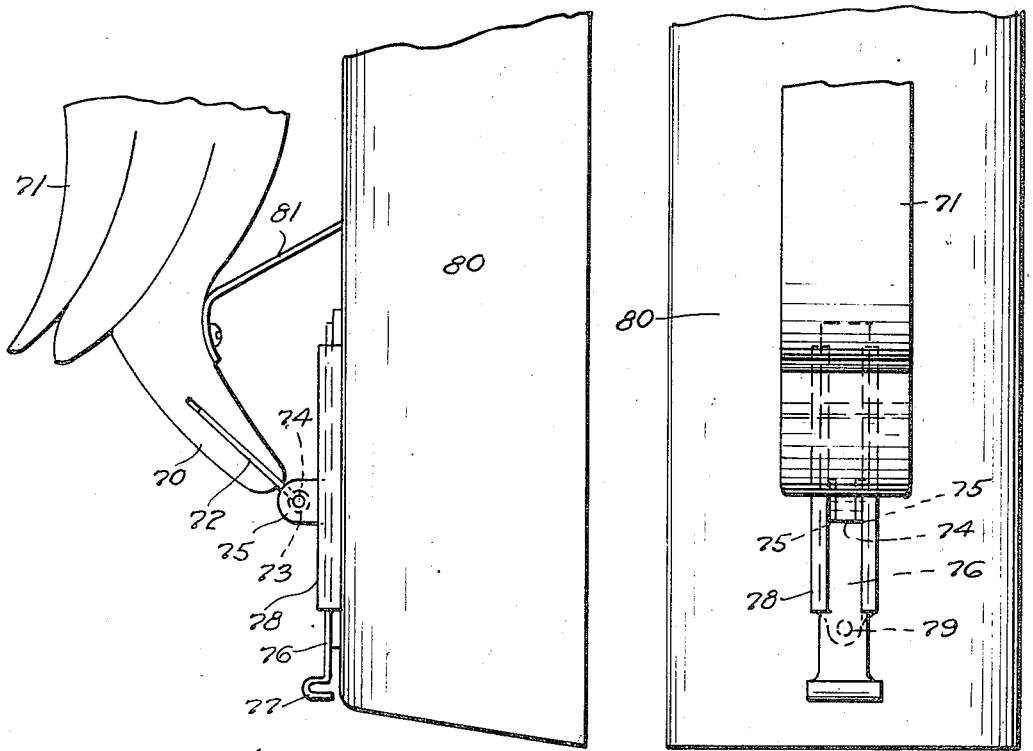
Figure 7 is a fragmentary side elevational view of a modified form of structure embodying features of this invention.
Figure 8 is a fragmentary front plan view of the modified form disclosed in Figure 7.

In the modification shown in Figures 7 and 8, alternate means of mounting the tail of the bird body in association with the case or cover, whereby to vary the intensity of the sound of the device, are disclosed. In this modification the tail 70 of a simulated bird body 71 has positioned therein a pin 72 terminating in an eye 73 adapted to surround a pivot pin 74 mounted between and within two upstanding lugs 75 secured to a slidable bar 76. Bar 76, which terminates in a curved portion 77 to provide a finger grip therefor is mounted for sliding movement in a channel-shaped member 78 secured in any suitable manner as by screws 79 passed through suitable apertures therein to the wall of a casing or cover 80 similar to case 13. In this modification it will be seen that movement of bar 76 upwardly and downwardly varies, through an arm 81 comprising an extension of the armature of the device, the position of suitable striking means with respect to suitable sounding members. Thus it will be seen that the intensity of the sound occasioned by the device of this modification may be modulated in a manner similar to that discussed in connection with the foregoing modification, it here being pointed out that all parts of the device shown in Figures 7 and 8, other than those above described are substantially identical to corresponding parts in the previous modification.

Now from the foregoing it will be seen that there is herein provided a device accomplishing all the objects of this invention and others including many advantages of great practical utility and commercial importance.

As many embodiments may be made of this inventive concept, and as many modifications may be made in the embodiments hereinbefore described and shown in the accompanying drawings it is to be understood that all matter herein is to be interpreted merely as illustrative and not in a limiting sense.

I claim:

1. In a device of the character described, in combination, a base, a casing, relay coils in said casing, an armature associated with said coils, an arm extending from said armature, a body in simulation of a woodpecker secured to said arm, a pivot securing an extremity of said body to said base, additional arms extending from said armature and having strikers thereon, sounding members associated with said additional arms, means to energize said coils to cause said armature to oscillate said body and said strikers.

2. In a device of the character described, in combination, a base, a casing, relay coils in said casing, an armature associated with said coils, an arm extending from said armature, a body in simulation of a woodpecker secured to said arm, a pivot securing an extremity of said body to said base, a member simulating the head of a woodpecker movably secured to the other extremity of said body, additional arms extending from said armature and having strikers thereon, sounding members associated with said additional arms, and means to energize said coils to cause said armature to oscillate said body and said head, and said strikers.

3. In a device of the character described, in combination, a base, a casing, relay coils in said casing, an armature associated with said coils, an arm extending from said armature, a body in simulation of a woodpecker secured to said arm, a pivot securing an extremity of said body to said base, a member simulating the head of a woodpecker movably secured to the other extremity of said body, a weight in said head secured to a resilient member extending into a recess in said body to cause the same to oscillate with respect to said body when said body is moved, additional arms extending from said armature having strikers thereon, sounding members associated with said additional arms, means to energize said coils to cause said armature to oscillate said body, said head and said strikers, and means to vary the intensity of a sound produced by said strikers on said sounding members.

HAROLD M. CAMERON.